United States Patent [19]

Takoushian

[11] Patent Number: 4,555,132
[45] Date of Patent: Nov. 26, 1985

[54] PORTABLE CANINE COMMODE

[76] Inventor: John Takoushian, 741 Rutland Ave., Teaneck, N.J. 07666

[21] Appl. No.: 200,455

[22] Filed: Oct. 24, 1980

Related U.S. Application Data

[63] Continuation-in-part of Ser. No. 030,603, Apr. 16, 1979, abandoned.

[51] Int. Cl.[4] ............................................. A01K 29/00
[52] U.S. Cl. .................................................. 294/1.5
[58] Field of Search ................ 294/1 B, 1 BA, 1 BB, 294/55, 65.5; 4/230; 15/104 B, 257.1, 257.3, 257.6; 24/201 B; 119/1; 220/87, 230, 403, 404, 408, 410

[56] References Cited

U.S. PATENT DOCUMENTS

| | | | |
|---|---|---|---|
| 412,273 | 10/1889 | Kinney | 4/230 X |
| 643,489 | 2/1900 | Fischer | 220/87 |
| 953,756 | 4/1910 | Olson | 15/257.6 |
| 2,755,011 | 7/1956 | Carew | 24/201 B X |
| 3,346,140 | 10/1967 | Mele | 220/87 |
| 3,804,448 | 4/1974 | Schmieler | 294/1 BA |
| 4,042,269 | 8/1977 | Skermetta | 294/1 BB |

Primary Examiner—Johnny D. Cherry
Attorney, Agent, or Firm—Arnold D. Litt

[57] ABSTRACT

A portable pet toilet, comprising a receptacle member having a side wall element defining a top mouth portion and a bottom mouth portion and a lid member and a bottom wall element that are pivotably mounted on the receptacle member at the top mouth portion and bottom mouth portion, respectively. The pet toilet comprises an elongated handle member, structure for actuating the lid member and bottom wall member, and a cover element removably disposed at the inside surface of the bottom wall element.

14 Claims, 21 Drawing Figures

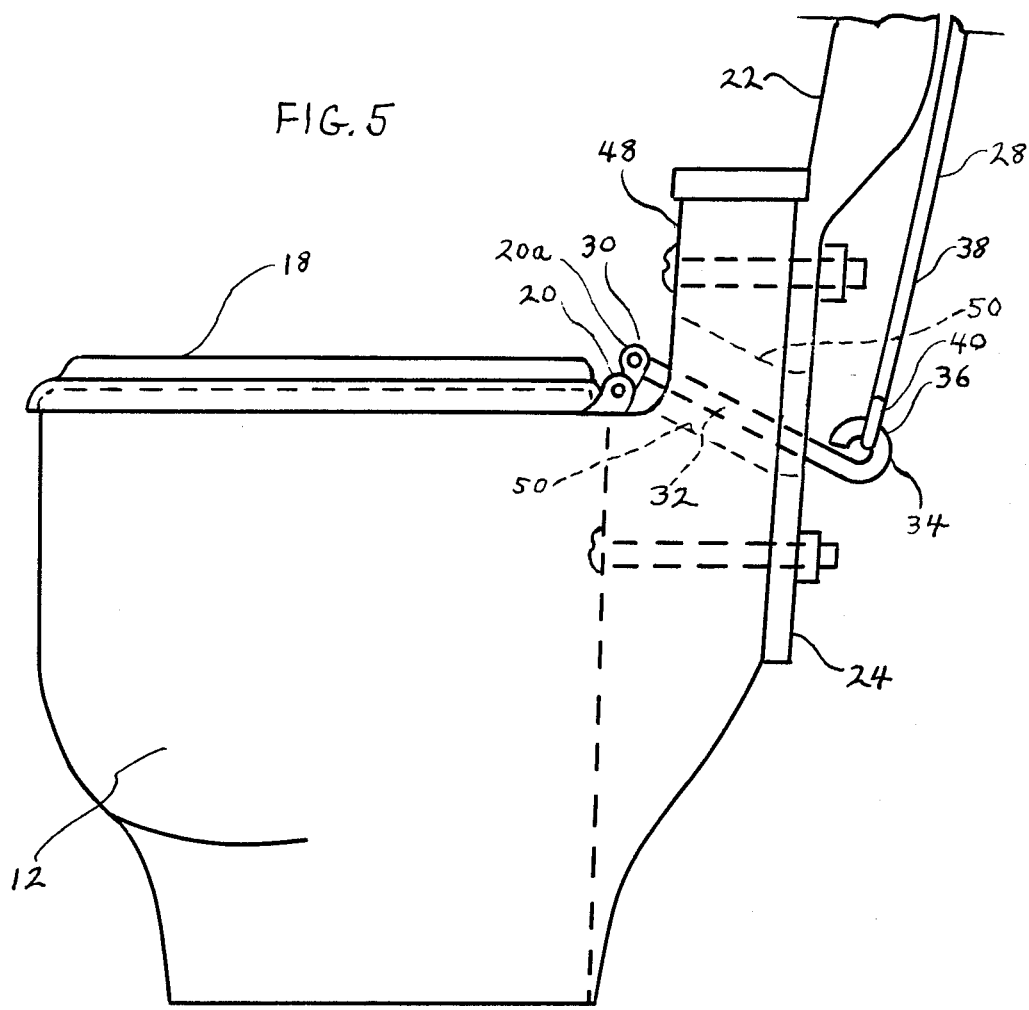
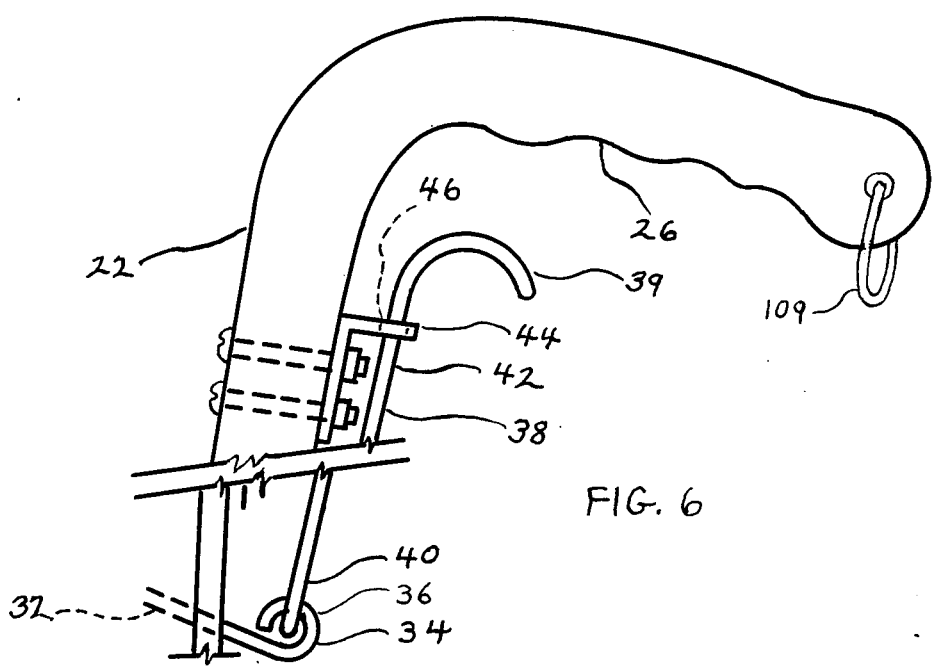

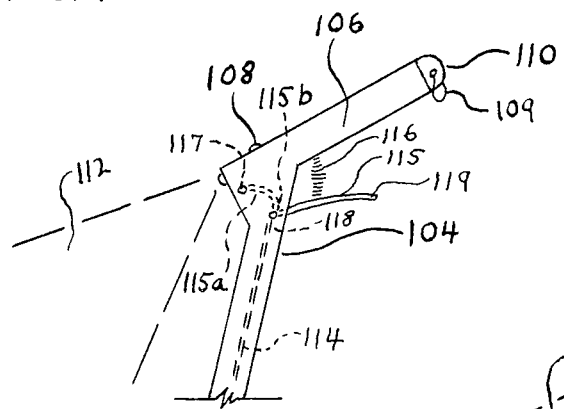
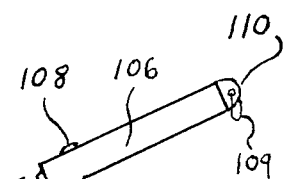
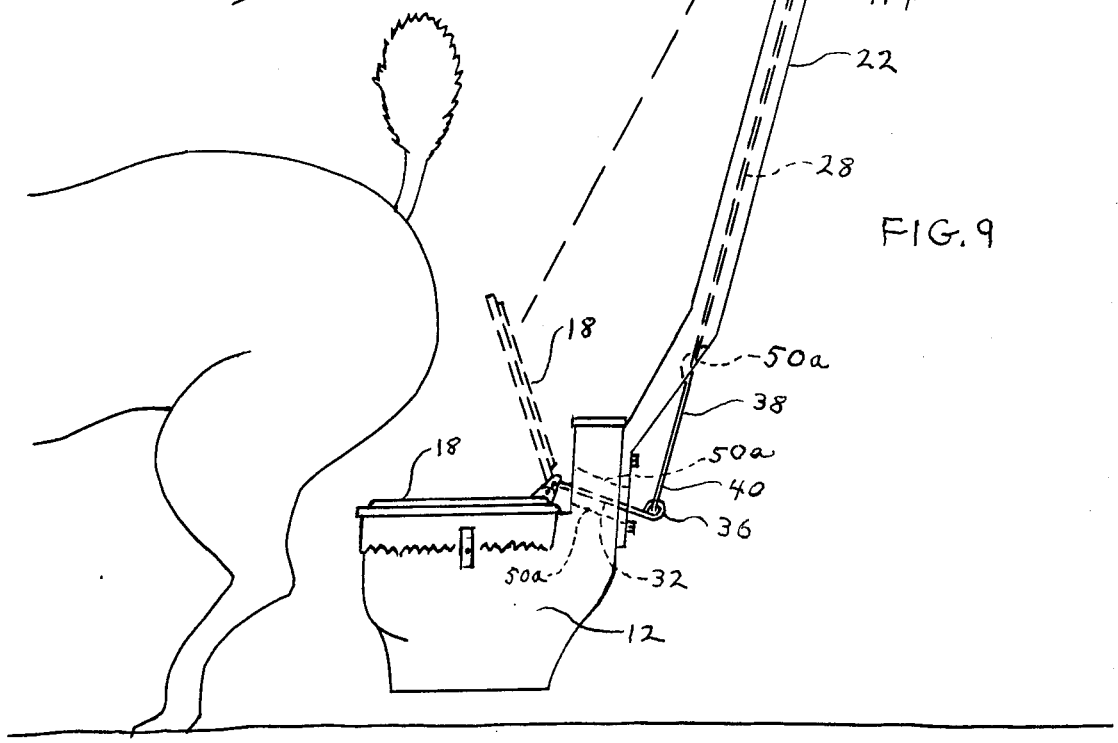

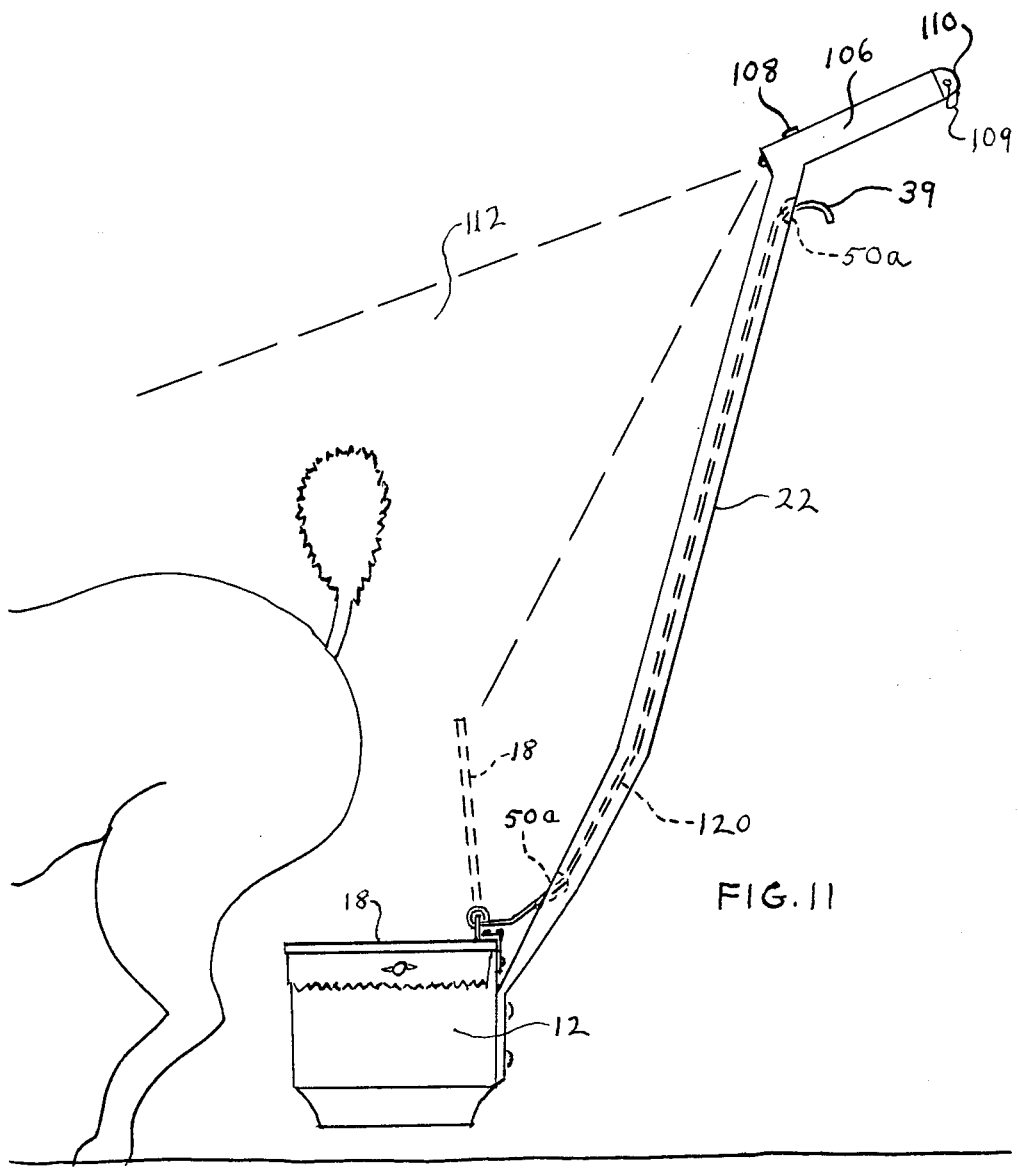

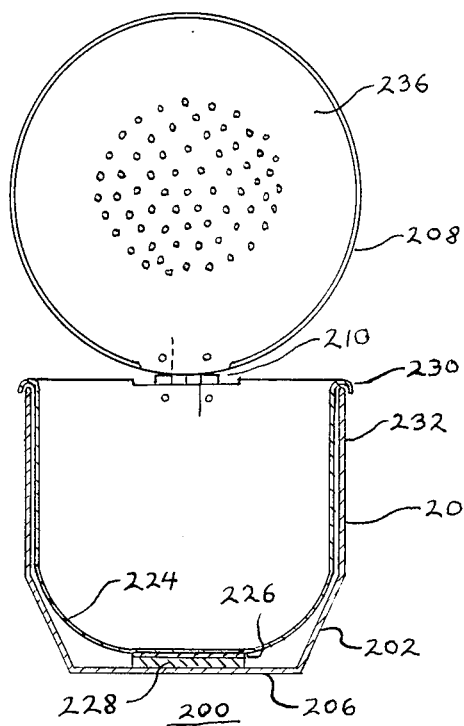
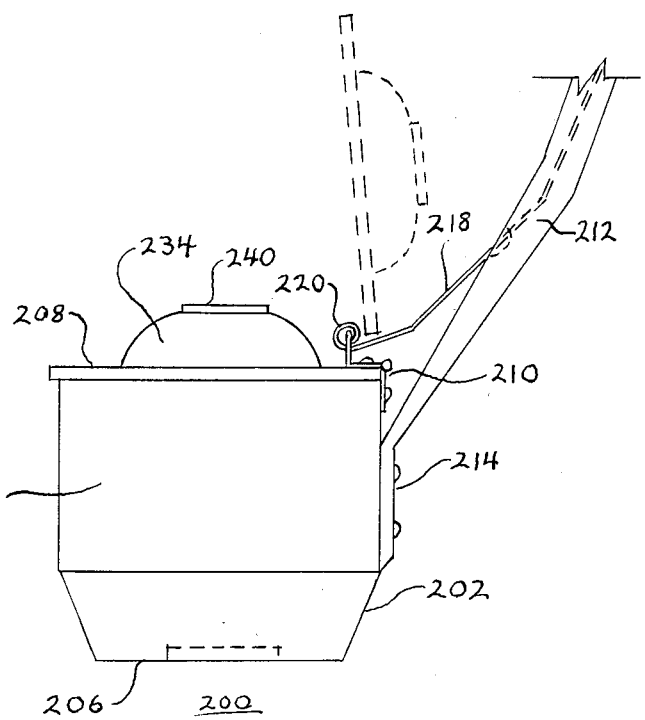
FIG. 16  FIG. 17
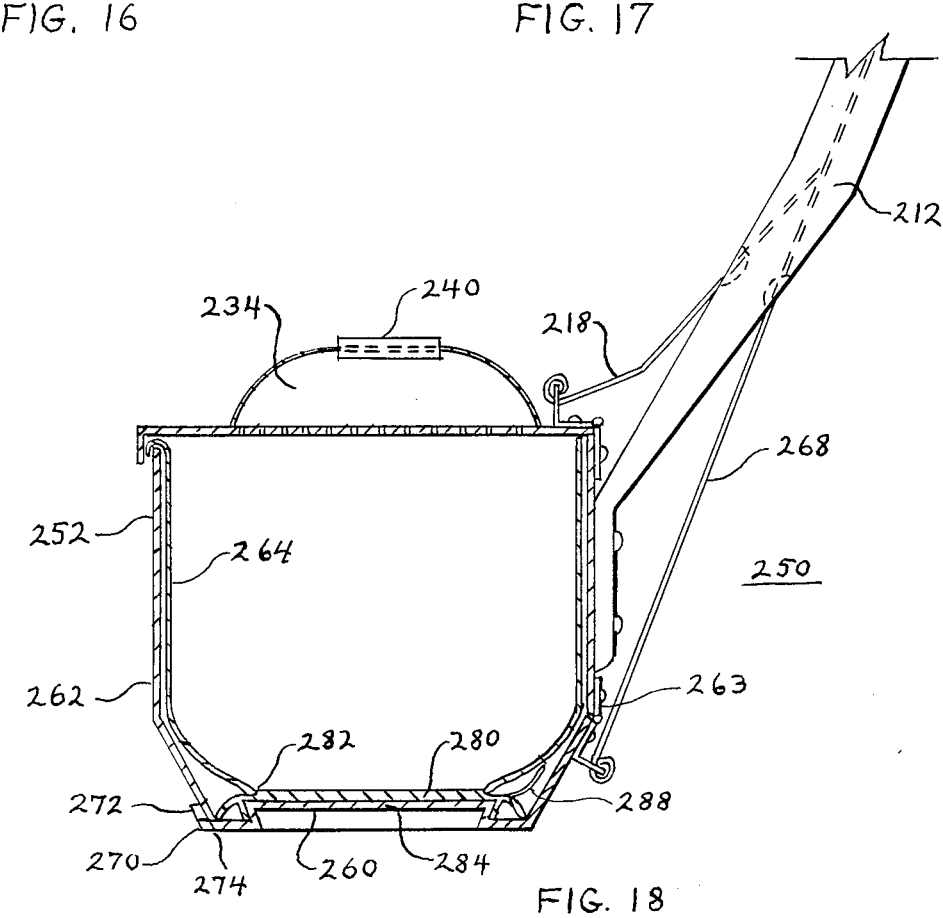
FIG. 18

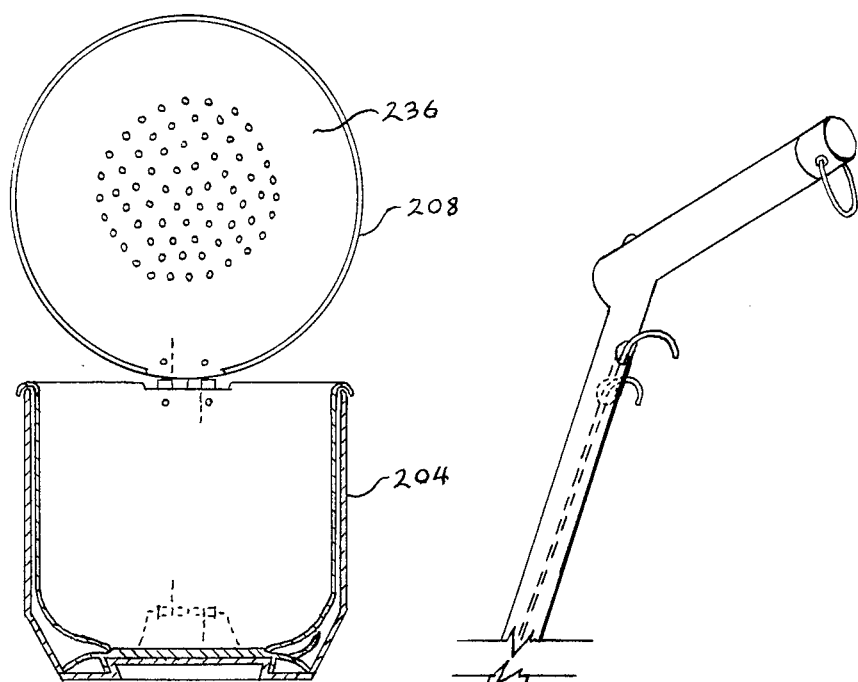
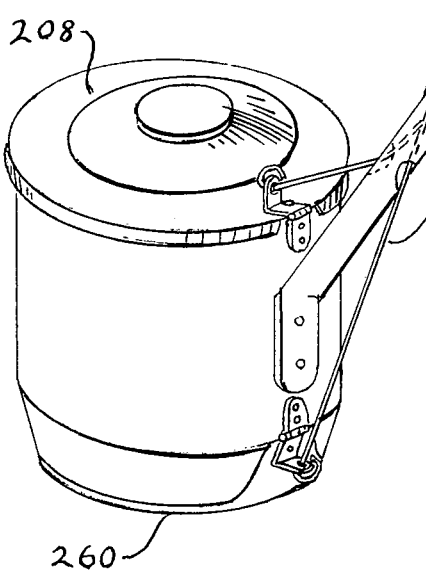
FIG. 20
FIG. 21
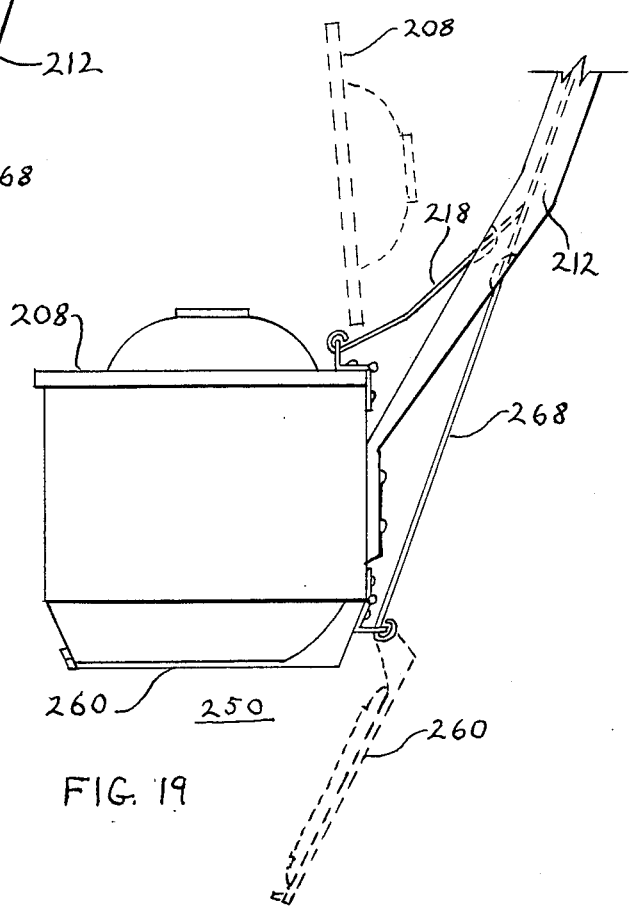
FIG. 19

PORTABLE CANINE COMMODE

This is a continuation-in-part of application Ser. No. 30,603, filed Apr. 16, 1979, now abandoned.

BACKGROUND OF THE INVENTION

This invention relates to sanitary waste disposal and in particular to a portable sanitary waste receiving device ideally suitable for use with dogs and cats.

Many people today keep dogs as pets. These animals are easily trained to relieve themselves at one or two specific times during the day. The owner of the pet usually walks the animal in the street and allows the animal to pass his waste products to the ground. In many areas the law requires the dog owner to clean up the waste.

There are a variety of devices in the prior art for picking up animal droppings. Such devices have heretofore had various shortcomings. The device disclosed in U.S. Pat. No. 3,446,525 has an elongated handle and a pair of open frame members at its lower and which are adapted to hold a disposable film bag, with the bag opening downwardly. The device may be then placed over a body or pile of animal droppings and operated to move the frame members toward one another so as to enclose the animal droppings between portions of the film bag. Such a device, though effective for a single body of droppings, is not satisfactory for sequentially picking up more than one body of droppings. As the device is opened for a second load, the intial load will tend to fall out. The result is that progressively larger multiple bodies of such droppings would have to be picked up by the device at each subsequent operation or, alternately, the device would have to be unloaded by removing the disposable bag after each pickup and substituting a new bag for the next pickup. Also well known in the art are separate receptacle and pusher which are each individually mounted on handles and manually operated by the user to push the animal droppings into the receptacle for transportation. Such devices involve two separate parts and therefore two-handed operation. They also involve the problems of continually cleaning the contaminated utensils.

The device of U.S. Pat. No. 3,757,737 is a mechanical pickup device for animal droppings which is remotely operable from the upper end of an elongated handle and which has pickup means at the lower end of the handle capable of sequentially propelling a series of bodies of animal droppings from the ground into a disposable bag carried by the device.

This type of device in the prior art is not generally satisfactory because it permits the waste to come into contact with the ground and generally is not capable of picking up small pieces of soft waste.

The device of the present invention contemplates a waste receiving device for animal droppings which is remotely operable from the upper end of an elongated handle member that has one end connected to a receptacle member that has side and bottom walls and a lid member. The lid member is pivotably mounted on the receptacle member at a side wall area of the latter and is controllable by means of lid actuating means that are located at the handle member.

The lid actuating means includes mechanical linkage that has one end connected to the lid member and a second end spaced from the receptacle member and terminating near the free or second end of the handle member. The second end of the linkage is free and is accessible to the user, the second end being maneuverable by the user to open or close the lid by means of the linking system. The present device permits the waste to be deposited directly into the receptacle member, thus alleviating the above shortcomings.

BRIEF DESCRIPTION OF THE DRAWINGS

FIG. 5 is a side view of the lower part of a device shown in FIG. 1, FIG. 6 is a side view of the upper part of the handle member, FIG. 9 is a side elevation view of the waste collector device according to another preferred embodiment, FIG. 10 is a partial side view of the device according to another preferred embodiment of the invention, FIG. 11 is a side elevation view of the pet waste collector according to still another embodiment.

FIG. 16 is a sectional front elevation view of a portion of the receptacle member of the device according to another embodiment.

FIG. 17 is a side elevation view of the receptacle member of the device in FIG. 16, the lid member being shown raised in phantom view.

FIG. 18 is a partial sectional side elevation view of the device according to another embodiment of the present invention.

FIG. 19 is a partial side elevation view of the pet toilet shown in FIG. 18 with the lid member and the bottom wall element shown in phantom view in their open positions.

FIG. 20 is a sectional front elevation view of the receptacle member of FIG. 18.

FIG. 21 is a perspective view of the pet toilet shown in FIG. 18.

DESCRIPTION OF THE PREFERRED EMBODIMENTS

Figure 1:
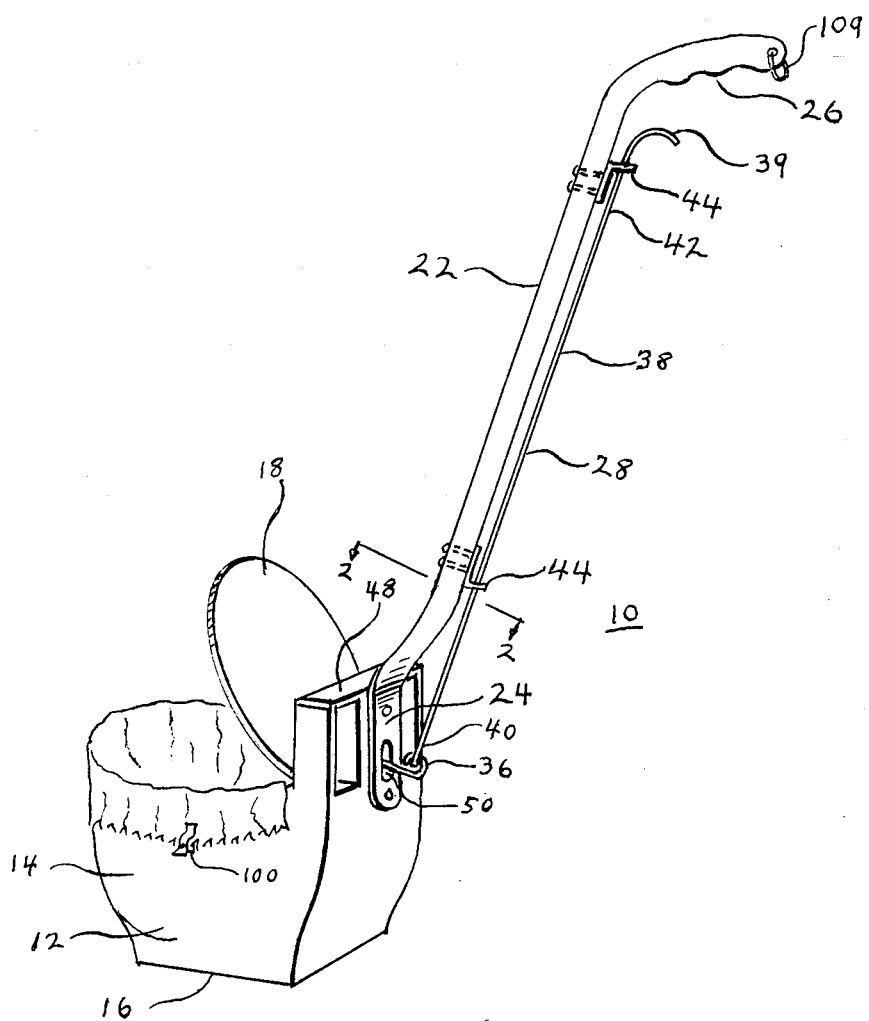
FIG. 1 is a perspective view of the pet waste collector device of the present invention having a disposable container in the receptacle member.
Figure 3:
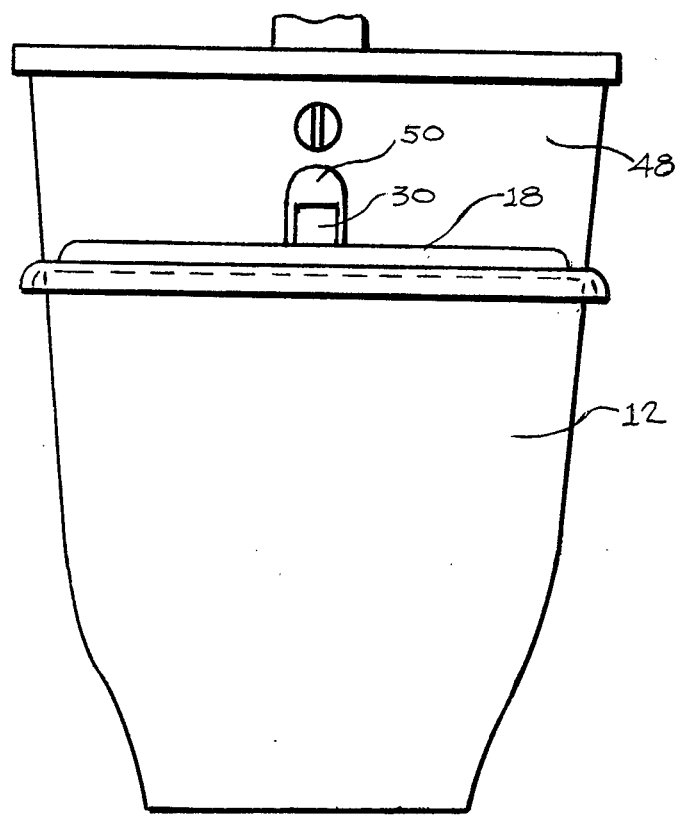
FIG. 3 is a fragmentary front view of the device in FIG. 1.
Figure 4:
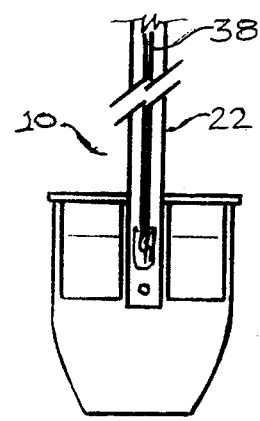
FIG. 4 is a rear view of the device in FIG. 1.
Figures 14, 15:
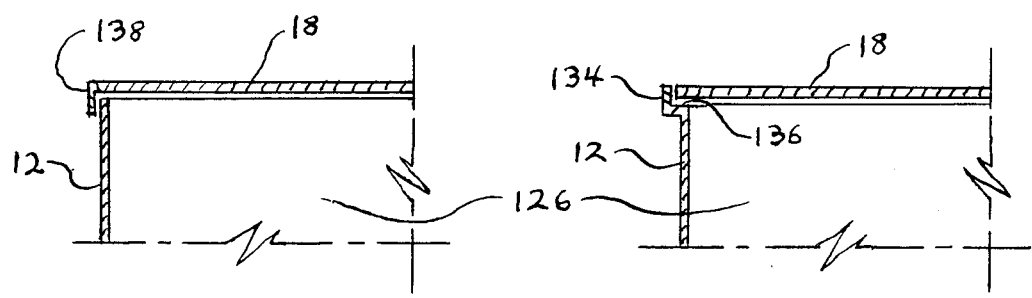
FIGS. 14–15 are fragmentary front elevation views in cross-section, of the receptacle member according to other preferred embodiments.

In the portable pet waste collector device or "canine commode" shown in FIG. 1, the device 10 contains a receptacle member 12 that has side walls 14 and a bottom wall 16 and a lid member 18 that is pivotably mounted by a hinge 20 (FIG. 12) or other suitable means to a side wall area of the receptacle member 12. The lid member 18 can be moved from a normal lowered position, in which the lid member 18 fully closes the mouth of the receptacle member 12 to a raised position, in which the interior of the receptacle member 12 is accessible. The lid member 18 should be of such size as to completely close the mouth of the receptacle member 12. It is preferred that the lid member 18 comprise a lip portion that overlaps the mouth rim of the receptacle member 12 as shown in FIG. 14.

The device 10 also includes an alongated handle member 22 that is connected at one end 24 thereof to the receptacle member 12 to provide a unitary structure. The connection of the handle member 22 and receptacle member 12 preferably is permanent or fixed, and the handle member 22 is generally inclined (i.e., the handle member's axis is inclined) at an angle to the horizontal. The handle member 22 has a free second end 26 that the user can grasp for lifting or moving the device 10.

Figure 2:
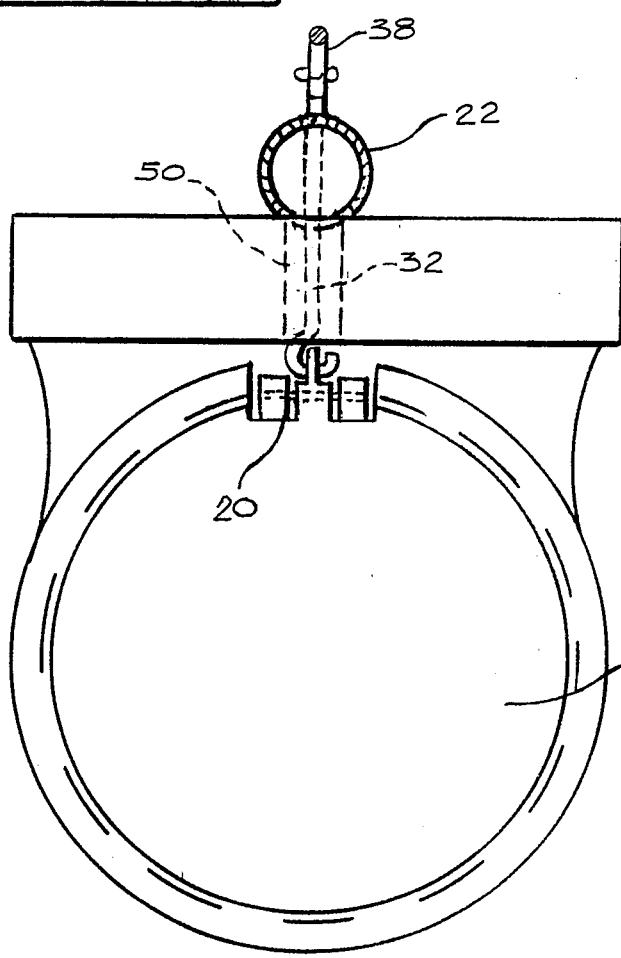
FIG. 2 is a top view along axis 2—2 of the device in FIG. 1.

Also included in the device 10 is a lid actuating means, which preferably includes a mechanical linkage system 28 and has one end 30 (see FIG. 5) connected to the lid member 18, preferably near the area of the hinge 20. The linking system 28 includes a first link member 32 that is connected at its first end portion 30 to the lid member 18 and at its second end portion 34, which can include an eyelet 36 (FIG. 5) to a second link member 38, which preferably is an elongated rod having one end part 40, which can be an eyelet, connected to the second end portion 34 of the first link member 32 and its second end part 42 located near the free or handle end 26 of the handle member. The distal part of the second end 42 of the second link member 38 can include a generally hook-shaped portion 39 to permit the user to engage same with his finger while grasping the handle end 26 with the same hand. The device can also include one or more guides 44, one of which is located near both the second end part 42 of the second link member 38 and the handle and 26, which guides 44 can be mounted on the handle member 22 and each contain an aperture 46 through which the second link member 38 (which preferably is adjacent and is generally aligned with the handle member 22) passes. The guide 44 retains the second link member 38 in place and limits the non-axial movement of the second link member 38, which can be moved axially, in both directions, through guide aperture 46.

Where it is desired, the receptacle member 12 can include an elevated back wall 48 that is above the mouth of the receptacle member 12, such wall limiting the backward movement of the lid member 18. The back wall can be an open frame, as shown in FIG. 1, or it can be a closed wall. It is preferred that the first end 24 of the handle member 22 be attached to the back wall 48 when there is one present and, further, that the first end 24 of the handle member 22 and the back wall of the receptacle contain an aperture 50 (FIGS. 1 and 2) through which the first link member 32 of the linkage 28 pages and is pivotably movable, such aperture 50 serving to guide the first link member 32 and limit its movement. Alternatively, the link member for controlling the lid of the device can pass through the aperture 50 (FIG. 7) in the handle member 74, the aperture then preferably being vertically oriented and slot-shaped to permit the necessary up and down movement of the link member 78 when the linkage 78 is used to move the lid. In the embodiment in FIG. 7, only a single link member 78 can be used which link member 78 comprises a bend near its lower extremity so that the lower part 78a thereof is angularly disposed with respect to the upper part 78b thereof, the link member in this instance preferably comprising a relatively stiff wire or small diameter rod. Where it is desired the link member can be of flexible material, such as metal wire cord, or other suitable material.

In the operation of the device 10, the user opens the lid 18 and permits access to the interior of receptacle 12 by raising the end part 42 (via hook 39) of the linkage system 28 (the opened receptacle being placed under the pet to receive waste). This causes the second link member 38 to be raised, lifting with it second end portion 34 of the first link member 32. The first link member engages the upper wall of aperture 50 and pivots thereabout, so that, as a result, the first end portion 30 of the first link member 32 moves downward, bearing down on hinge arm 20a (FIG. 5) and causing the lid 18 to be raised, the lid 18 swinging about hinge 20.

The receptacle member 12, handle member 22, and linkage 28 can be of metal, plastic, or other suitable metal. The receptacle member 10, at least, preferably is of non-porous material for cleaning ease and has a smooth interior surface. While the receptacle member 10 can have a rounded bottom, it is preferred that the bottom have a flat outside surface 16 (FIG. 1) so that the device can be rested on the ground at this surface 16 and maintain its stability with the user holding up the free end of the handle member 22. The handle member can be connected or joined to the receptacle member and the guide 44 by screws, bolts, or other suitable means.

Figure 7:
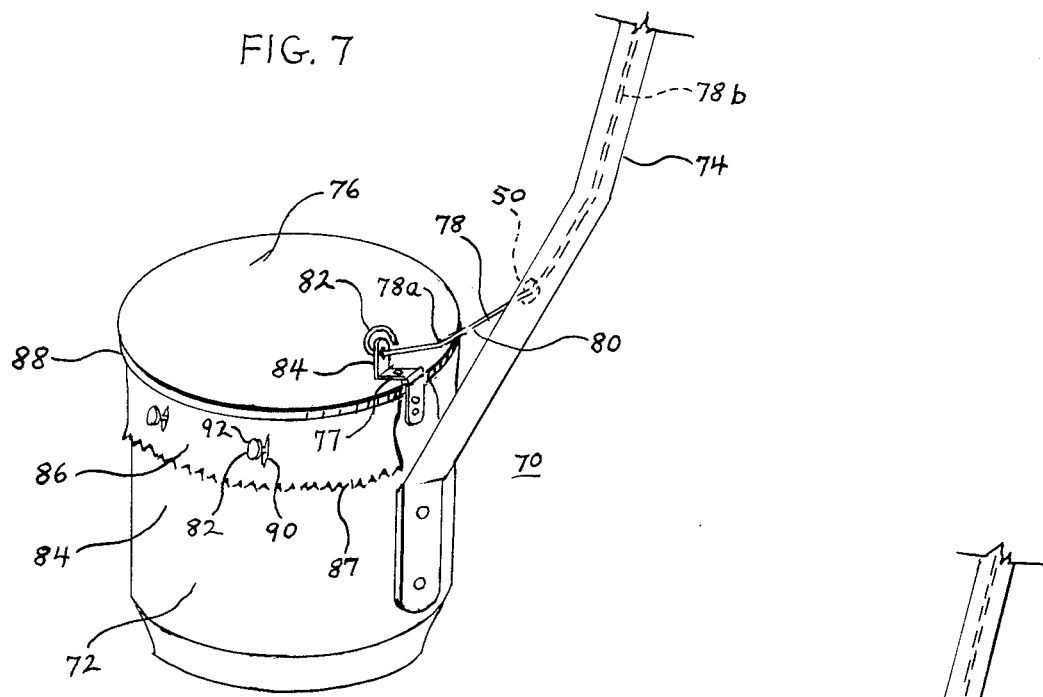
FIG. 7 is a fragmentary perspective view of the waste collector device according to a second preferred embodiment of this invention.

In a further embodiment shown in FIG. 7, the device 70 comprises a receptacle member 72 and a handle member 74 fixedly connected thereto. Also included is a lid member 76 and a lid actuating linkage 78 that comprises a single link member 80 having one end 82 connected to a lug 84 on the lid member 76, which lid member 76 is pivotably disposed on the receptacle member 72 by means of a hinge 77. The link member 80 extends through a channel (not shown) in the handle member 74 from an opening at the upper end thereof to an opening 50 at the lower end proximate the lid member 76, the free (upper) end of the link member 80 being generally similar to that of the previous embodiment.

Figure 8:
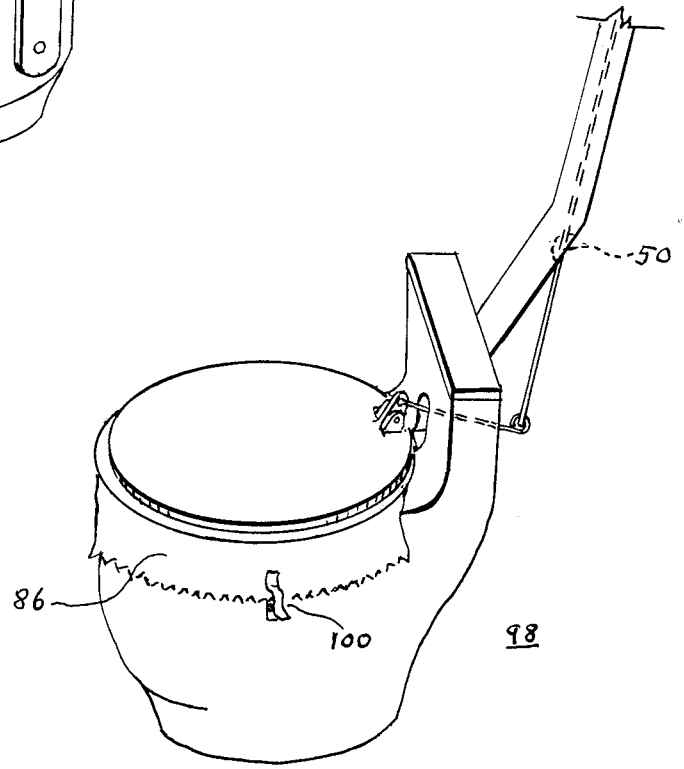
FIG. 8 is a fragmentary perspective view of the device of the present invention according to another embodiment.

This device 70 further includes means for retaining disposable containers at the receptacle member, which means can be a number of posts or lugs 82 disposed peripherally around (preferably, the upper regions of) the outer surface 84 of the receptacle member 72 and can be used with disposable containers 86 such as plastic or paper bags, for example. The container 86 is received by the receptacle member, the mouth parts 87 of the disposable container 86 being folded over the ridge 88 of the receptacle member 72 so that these posts or lugs 82 penetrate the folded over part 87 of the container and extend through the formed perforation 90 to retain the container 86 in place at the receptacle member 72 while the device 70 is being used. Where it is desired, the container 86 can already have perforations in it for receiving the posts 82, which can include heads 92 to avoid the containers slipping off, which feature permits the waste to be emptied from the container by tipping the device, without the need for removing the container. Alternatively, the device 98 (FIG. 8) of the present invention can include one or more spring clips 100 instead of the posts 82 (FIG. 7), same serving as means for retaining the disposable container 86 in place.

In the embodiments shown in FIGS. 9 and 10 (where, as in the other Figures, numerals refer to parts similar to correspondingly numbered parts of the other embodiments) the handle member 104 comprises a light element 106 built into it for providing light 112 to illuminate the receptacle member region. The light member 106 comprises an on-off switch 108 that can be operated with the operator's hand holding the handle member 104. The handle member at the upper end comprises a hollow chamber for receiving dry cells for energizing the light bulb therein and an end cap 110 that closes the chamber. The device of the invention can be utilized (i.e., held, the lid controlled, and the light controlled and directed) with one hand, leaving the user's other hand free to hold the pet. The light feature permits the pet to be walked at night.

According to the embodiment shown in FIG. 9, the handle member 22 contains a part of the lid actuating system 28 comprising the first link member 32 and the second link member 38 (which are similar to those described in FIG. 5), the second link member 38 being an elongated rod, for example, with an eyelet at the lower end for joining the second link member 38 to the first link member 32 via an eyelet 36 of the latter. The second link member 38 passes, at its lower and upper ends, respectively, out of the handle member 22 at openings 50a. The first link member passes through an opening or channel in the wall of the receptacle member 12 to the lid member, to which it is connected via a hinge element, as previously described, or by other suitable means. The upper end part of the second link member 38 has a hook-shaped configuration, by means of which the user can activate the lid actuating system.

In the embodiment of FIG. 10, the lid actuating system comprises a link member 114 located within the handle member 104, the link member comprising a trigger element 115, biasing means, e.g., a spring 116, being located between the trigger element 115 and the upper part 106 of the handle element. The trigger element 115 is pivotably connected at its end portion 115a to an anchor 117 and the upper end 118 of the link member 114 is pivotably connected within the handle member to the trigger element 115 at a point 115b intermediate the ends of the trigger element. The spring 116 normally urges the trigger element 115 away from the handle element upper part 106. Squeezing the trigger element 115 so that it moves toward the handle element upper part 106 causes the trigger element 115 to pivot about its anchor point 117, this causing the intermediate part 115b to move upward and the link member 114 to move upward also, opening the lid member (not shown, the lid actuating system being generally similar to that shown in FIG. 9). The trigger element exposed part 119, when released by the user, is urged by the spring 116 to its normal lowered position, as a result of which the intermediate part 115b and the link member 114 are lowered, causing the lid member to be lowered to a closed position.

Where it is desired, the device of the present invention can comprise a lid actuating system leaving a single link member 120, as shown in FIG. 11, that passes from the lid member 18, to which it is connected, into the lower part of the handle member 22 via lower opening 50a and out of the upper part of the handle member 22 via upper opening 50a.

According to another preferred embodiment, the lid member 18 (FIG. 12) can be pivotably mounted on the receptacle member 12 via a hinge element 123, biasing means being employed to retain the lid member 18 in a normally closed position. The biasing means can be a butterfly spring 120 which has first and second leg portions 122 and 124, respectively, which engage, respectively, the outer surface of the lid member 18 and the inner wall surface 126 of the receptacle member 12. One of the legs 122, 124, preferably the leg 122, is secured to the part that it engages (i.e., leg 122 is secured to the engaged surface of lid 18). The butterfly spring 120 comprises a coiled portion between leg portions 122, 124. In this embodiment, as well as in others of this invention, the part 127 of the lid member 18 more removed from the hinge element 123 is provided (internally or externally) with a weighting element to facilitate the downward movement (for closing) of the lid member 18.

Where it is preferred, the first and second leg portions 122, 124 of the spring 120 engage, respectively, the inner surface of the lid member 18 and the inner wall surface 126 of the receptacle member 12, it being preferred that these leg portions both be anchored to the respective surfaces that they engage. In this situation, opening the lid will cause a change in the energy of the coiled portion of the spring 120, which results in the spring urging the lid to a closed position where the user is not applying a counter-acting force via the lid control mechanism.

Alternatively, the first and second leg portions 122, 124 can engage, respectively, the outer surfaces of the lid member and receptacle member, or respectively the inner surface of the lid member and the outer surface of the receptacle member. In the latter arrangement, the first leg member 122 can be anchored to the lid member 18.

Figures 12, 13:
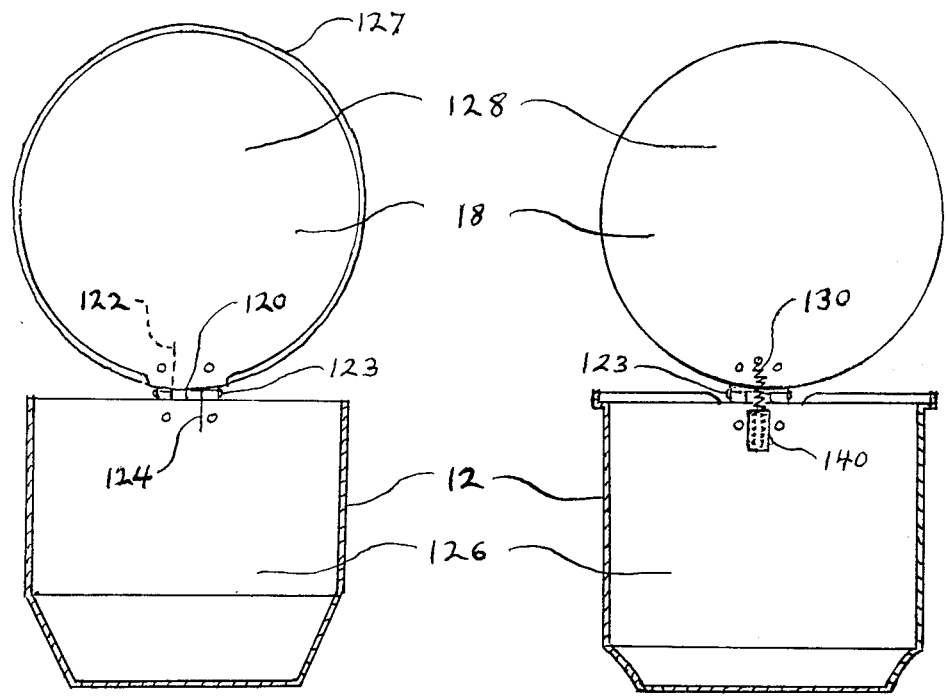
FIGS. 12–13 are sectional front elevation views of the receptacle member of the device according to certain respective preferred embodiments.

In another embodiment, the device (FIG. 13) comprises a helical spring member 130 having its ends connected to, respectively, the inner surface 128 of the lid member 18 and the inner wall surface 126 of the receptacle member 12. This spring member 130 serves to retain the lid member 18 in a normally closed position, the lid member 18 being hingedly connected to the receptacle member 12 via a hinge element 123. It is preferred that the spring member 130 be enclosed to avoid its entangling the disposable container, this being done, e.g., by enclosing the spring member 130 within a flexible sheathing or sleeve 140 such as plastic tubing, for example (part of such a sleeve being shown for clarity). In the embodiments of FIGS. 12 and 13, the lid member 18 can be operated by lid actuating mechanisms described in the various other embodiments and the receptacle member 12 is connected to a handle element (not shown) as previously described.

In the embodiment of FIG. 14, the lid member 18 comprises a ridge portion 138 at its periphery, which ridge portion fits around the upper surface of the receptacle member 12 to attain better closure.

In still another embodiment, the device comprises a receptacle member 12 (FIG. 15) that has at its upper side wall a shoulder portion 134 that extends along at least part of the periphery of the receptacle member and receives the lid member 18 at the seat area 136 of the shoulder portion, providing better closure.

According to a further preferred embodiment of the invention, the portable pet waste collector device 200 (FIGS. 16 and 17) comprises a receptacle member 202 that has side walls 204 and a bottom wall 206 and a lid member 208 that is pivotably mounted by a hinge 210 or other suitable means to a side wall area of the receptacle member 202. The lid member 208 can be moved from a raised position (FIG. 16), in which the interior of the receptacle member 202 is accessible, to a lowered position (FIG. 17), in which the lid member 208 fully closes the mouth of the receptacle member 202. The lid member 208 preferably is of such size as to completely close the mouth of the receptacle member 202. It is preferred that the lid member 208 comprise a lip portion that overlaps the mouth rim of the receptacle member 202 as previously shown.

The device 200 also includes a elongated handle member 212 that is connected at one end 214 thereof to the receptacle member 202 to provide a unitary structure. The connection of the handle member 212 and receptacle member 202 preferably is permanent or fixed, and the handle member 212 is generally inclined (i.e., the handle member's axis is inclined) at an angle to the horizontal. The handle member 212 has a free second end (not shown) that is similar to that previously shown by which the user can grasp for lifting or moving the device 200.

Also included in the device 200 is a lid actuating means, which preferably includes a mechanical linkage system 218 and has one end 220 connected to the lid member 208, preferably near the area of the hinge 210. The linking system 218 can include a first link member (similar to FIG. 5) that is connected at its first end portion 220 to the lid member 208.

The device 200 preferably also comprises a removable insert receptacle 224 that can be made of any suitable material, it being preferred that the insert receptacle be of a plastic, metal or other liquid impermeable material, that preferably is such that the waste materials do not readily stick to it (e.g., Teflon). The insert receptacle 224 is adapted to be received in the receptacle member 202 and has, as a part of the bottom wall thereof or, as shown in FIG. 16, attached to the outside surface of the bottom wall a first magnetic element 226, by which is meant a magnet, per se, or a material (e.g., iron) that is attracted by a magnet, whose purpose is explained below. The receptacle member 202 comprises at the inner surface of its bottom wall 206, a complementing second magnetic element 228, which is a magnet where element 224 is magnetically attracted material or is a magnetically attracted material where the first element 224 is a magnet. In this way, the insert receptacle is removably disposed in the receptacle 202, but can be readily removed by lifting it and yet is not dislodged when the device 220 is tipped to empty the waste.

The insert receptacle 224 can comprise a curved lip or shoulder 230 that can receive the upper edge or mouth portion 232 of the receptacle 202.

It is further preferred that the device 200 also comprise a compartment defining portion 234 disposed at the lid member 208, as shown in FIG. 16. The inside surface 236 of the lid member 208 preferably is apertured at the area corresponding with the compartment and there can be placed in the compartment of the lid 208 a suitable powder (e.g., talcum) or a dispenser (such as a puff) for such powder, which can be dispensed into the insert receptacle 224 by tapping the lid 208 while it is in the closed position, to cause the powder to drop into the insert receptacle 224. The powder can serve to deodorize the receptacle 224, as well as to form a layer on the interior surface of the receptacle 224 that reduces sticking of solid waste to the surface.

The compartment defining portion 234 should have an access port for inserting when needed, the powder or powder dispenser. This port can be a screw-on or press-in type of cap 240.

In a further embodiment (FIG. 18) where parts similar to the device 200 of FIGS. 16 and 17 are designated by the same numerals, the device 250 includes the bottom wall of the receptacle member 252 in the form of a pivotably mounted lower lid 260, which is mounted at an area of the side wall 262 by a hinge 263 or other suitable means. The lower lid 260 is operable by a second mechanical linkage system 268, which can be similar to the linkage system 218 for the top lid 208. The lower lid can be moved from a closed position (FIG. 18) to an open position (FIG. 19), to remove the collected waste material. In this case the insert receptacle 264 has an open bottom, which opening is closed by the lower lid 260, preferably but not necessarily to form a waterproof seal therebetween.

Where desired, the lower lid 260 can be held in its closed position by means of a magnetic catch 270 (FIG. 20) which can be in the form of two complementing magnetic members (i.e., one magnet 272 and one magnetically attracted member 274), such that when the lower lid 260 is raised to its closed position, the magnetic members 272, 274 engage and serve to hold the lid 260 in a closed position.

According to another embodiment, the lower lid 260 can be covered, at its inside surface, by a removable cover 280 (FIG. 18) that can be replaced from time to time. Such a cover can extend beyond the mouth 282 of the insert receptacle 264 and have a concave lower portion that can receive and engage a raised portion 284 of the lower lid, thus snugly retaining the cover 280 in place on the lower lid 260. The cover 280 can also include a protruding tab 288 (FIG. 18) that can be grasped to remove the soiled cover 280 from the lower lid 260. There can be provided spring means for closing the lower lid 260, when desired.

I claim:

1. A portable pet toilet comprising:
   (a) a receptacle member having a side wall element, said receptacle member defining a top mouth portion and a bottom mouth portion, and further comprising a bottom wall element and a top lid member that are pivotably mounted on said receptacle member, said top lid member closing said top mouth portion and said bottom wall element closing said bottom mouth portion,
   (b) an elongated handle member fixedly connected at a first end thereof to an outer wall area of said receptacle member, said handle member having a free second end and being angularly disposed with respect to the horizontal,
   (c) top lid actuating means and bottom wall actuating means located at said handle member, said actuating means permitting said top lid member and said bottom wall element to be moved from respective first positions at said mouth portions to a second position whereby the interior of said receptacle member is accessible,
   (d) an insert receptacle disposed within said receptacle member, said insert receptacle having openings at, respectively, its top and bottom, and
   (e) said bottom wall element comprising an inside surface cover element removably disposed at said bottom wall inside surface, said insert receptacle bottom opening being closable by said bottom wall element, with said inside surface cover element disposed partly between said insert receptacle and said bottom wall element such that said inside surface cover element is disposed only at the said bottom opening of said receptacle member, said inside surface cover element comprising a generally concave lower portion and said bottom wall element comprising a raised portion that is received by and engages said concave lower portion of said inside surface cover element, whereby said inside surface cover element is retained in position.

2. A pet toilet as in claim 1, wherein said lid actuating means comprises a mechanical linkage that includes a first link member and a second link member, said first link member comprising a first end connected to said lid member and a second end portion, said second link member having one end part connected to said second end portion of said first link member and a second end part located near said handle second end.

3. A pet toilet as in claim 1, wherein said lid member comprises a lip portion that can overlap the mouth rim of said receptacle member.

4. A pet toilet as in claim 1, wherein said insert receptacle is removably disposed in said receptacle member and said pet toilet further comprises means for retaining said insert receptacle at said receptacle member.

5. A portable pet toilet as in claim 4, whereby said retaining means comprises a magnetic catch comprising two complementing magnetic members.

6. A pet toilet as in claim 1, further comprising biasing means for retaining said lid member in a normally closed position.

7. A pet toilet as in claim 6, wherein said biasing means comprises a butterfly spring element comprising first and second protruding legs and a coiled portion therebetween.

8. A pet toilet as in claim 7, wherein said first leg engages said lid member and said second leg engages said receptacle member.

9. A pet toilet as in claim 1, wherein said receptacle member comprises a shoulder portion that is located at its upper side wall at the mouth thereof and extends along at least a part of the periphery of said receptacle member, said shoulder portion receiving said lid member.

10. A portable pet toilet as in claim 1, comprising means for dispensing an anti-sticking agent into said receptacle member, said dispensing means being disposed at said lid member.

11. A portable pet toilet as in claim 10, wherein said lid member comprises an apertured area and said dispensing means is defined by said lid member apertured area and a housing member disposed at said lid member.

12. A portable pet toilet as in claim 11, wherein said housing member comprises a closeable opening for providing access to the interior of said dispensing means, whereby said anti-sticking agent can be introduced into said dispensing means.

13. A pet toilet as in claim 1, further comprising a first hinge element connecting said receptacle and lid members, and a second hinge element connecting said bottom wall element and said receptacle member.

14. A portable pet toilet as in claim 1, wherein said removable cover element comprises a tab element adapted to permit the removal of said cover element from said bottom wall element.

* * * * *